United States Patent [19]
Hsueh

[11] Patent Number: 6,070,743
[45] Date of Patent: Jun. 6, 2000

[54] SUPPORTING SHELF FOR COMPACT DISKS

[76] Inventor: Ching-Ling Hsueh, P. O. Box 82-144, Taipei, Taiwan

[21] Appl. No.: 08/995,913

[22] Filed: Dec. 22, 1997

[51] Int. Cl.$^7$ .............................. A47G 29/00; B65D 21/02
[52] U.S. Cl. .............................. 211/40; 211/194; 206/519; D9/431
[58] Field of Search .................................. 211/41.12, 40, 211/194, 172, 105.3, 126.7; D6/407; D9/430–432; 206/509, 519

[56] References Cited

U.S. PATENT DOCUMENTS

| D. 31,253 | 7/1899 | Goldie | D9/431 |
|---|---|---|---|
| D. 78,468 | 5/1929 | Kositchek | D9/430 |
| D. 216,843 | 3/1970 | Lew | D9/431 |
| D. 318,766 | 8/1991 | Chow | D6/407 |
| D. 350,654 | 9/1994 | Chen | D6/407 |
| D. 386,082 | 11/1997 | Patterson et al. | D9/431 |
| 4,236,768 | 12/1980 | Morrone | 211/40 |
| 4,432,161 | 2/1984 | De Bruin | 206/519 |
| 4,771,895 | 9/1988 | Steiner | 211/105.3 |
| 4,826,261 | 5/1989 | Nademlejnsky | 211/194 |
| 5,176,264 | 1/1993 | De Palma | 211/41.12 |
| 5,301,819 | 4/1994 | Moeken | 211/40 |
| 5,333,741 | 8/1994 | Yang | 211/41.12 |
| 5,370,243 | 12/1994 | Rosario | 211/194 |
| 5,515,979 | 5/1996 | Salvail | 211/41.12 |
| 5,542,550 | 8/1996 | Kakavoulis-Perera et al. | 211/40 |
| 5,579,925 | 12/1996 | Peng | 211/41.12 |
| 5,607,065 | 3/1997 | Todd | 211/41.12 |
| 5,647,487 | 7/1997 | Reinhard | 211/41.12 |
| 5,669,494 | 9/1997 | Geffen | 211/41.12 |
| 5,680,937 | 10/1997 | Smith | 211/40 |

FOREIGN PATENT DOCUMENTS

| 1216157 | 11/1959 | France | 211/40 |
|---|---|---|---|
| 638690 | 10/1960 | Italy | 211/40 |

Primary Examiner—Daniel P. Stodola
Assistant Examiner—Jennifer E. Novasad
Attorney, Agent, or Firm—A & J

[57] ABSTRACT

A supporting shelf for compact disks includes at least a first tubular housing and a second tubular housing and each has a different inner diameter but a similar cross section. The second tubular housing that has a small inner diameter is disposed within the first tubular housing. Each of the first and second tubular housings has its opening directed upward for readily engagement therebetween. Each of the tubular housings is provided with a plurality of retaining slots at the outer wall and that are parallel to each other, wherein a CD can be readily inserted and retained by the retaining slots of the housings. When a plurality of first and second tubular housings are engaged with each other, a tower-shape supporting shelf can be configured. Each of the receiving slots can be directed upward and angularly. The engagement between the first and second tubular housing can be facilitated through retaining holes and pin-shaft or retaining ball and recess.

1 Claim, 6 Drawing Sheets

SUPPORTING SHELF FOR COMPACT DISKS

1. FIELD OF THE INVENTION

The present invention relates to a supporting shelf, more particularly, to a supporting shelf for compact disks (hereinafter referred to as CD) in which a plurality of individual supporting brackets can be piled upward to increase the loading capability.

2. DESCRIPTION OF PRIOR ART

The existing CD supporting shelf is integrally molded or integrally assembled from a plurality of individual configuring plate. However, the loading capability is fixed without any flexible arrangement. Generally, the loading capability or space of the existing CD shelf is around fifty (50) and these loading spaces are filled one by one. Besides, the existing CD shelf has a box-type or tubular configuration that is integrally assembled from a plurality of configuring plates. It is hard to say that the existing CD shelf has an aesthetic appearance.

SUMMARY OF THE INVENTION

The present invention relates to a supporting shelf, more particularly, to a supporting shelf for compact disks (hereinafter referred to as CD) in which a plurality of individual supporting shelves can be piled upward to increase the loading capability.

It is the objective of this invention to provide a supporting shelf for compact disks wherein the loading capability can be readily adapted to meet the requirements as the number of CD is increased.

It is a further objective of this invention to provide a supporting shelf for compact disks wherein the supporting shelf can be conveniently arranged to extend upward or horizontally to increase the loading capability.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF PREFERRED EMBODIMENT

Figure 1:
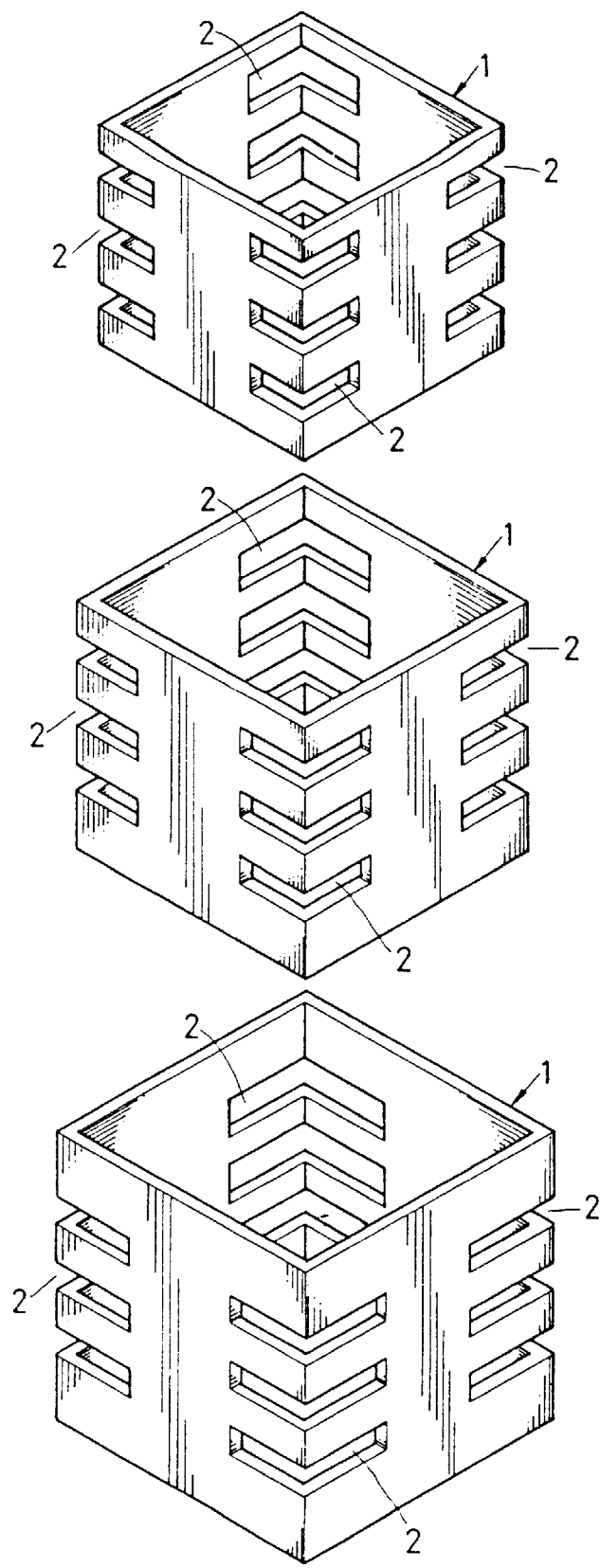
FIG. 1 is an exploded view of the supporting shelf made according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Referring to FIG. 1, the supporting shelf made according to the present invention generally comprises at least a first tubular housings 1 and a second tubular housing 1' and each has a different inner diameter but a similar cross section. The second tubular housing 1' that has a small inner diameter can be disposed within the first tubular housing 1. Each of the first and second tubular housings 1, 1' has its opening directed upward. Each of the tubular housings 1, 1' is provided with a plurality of retaining slots 2 at the corners of the housing 1 and that are parallel to each other. By this arrangement, the CD 3 can be readily inserted and retained by the retaining slots 2 of the housing 1.

Figure 2:
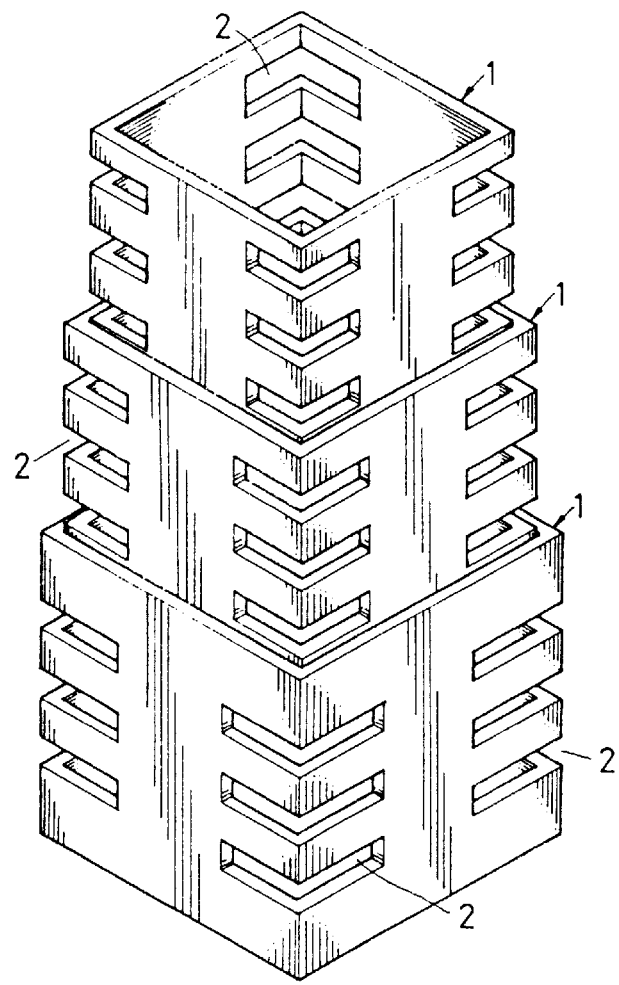
FIG. 2 is a perspective view of the supporting shelf in an extended arrangement.
Figure 3:
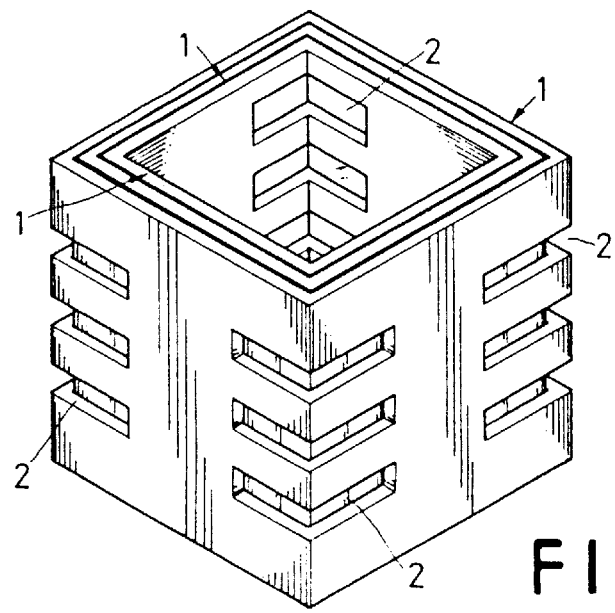
FIG. 3 is a perspective view of the supporting shelf in a fully stored arrangement.

On the other hand, the overall configuration of the first and second tubular housing 1 can be shaped with a trapezoid configuration, i.e. the lower end of second tubular housing 1' is slightly larger than the upper opening of the first tubular housing 1. By this arrangement, when the second tubular housing 1' is pulled upward, the lower end of the second tubular housing 1' will be engaged with the upper opening of the first tubular housing 1. As a result, when a plurality of tubular housings 1, 1' are connected in this manner, a tower shelf for CD 3 can be configured, as clearly shown in FIG. 2. On the other hand, if the number of CD 3 is minimal, the second tubular housing 1' can simply be disposed within the first tubular housing 1, as shown in FIG. 3.

From the forgoing description, it can be readily appreciated that the loading capability or slots of the CD 3 shelf can be readily adapted to meet different requirement. This is really advantageous for the customer. In the very beginning, the customer may only use the lowest tubular housing 1 for displaying or storing the CD 3. As the number of the CD 3 increases, the second tubular housing 1' can be pulled upward to increase the loading capability, as shown in FIG. 2.

Figure 4:
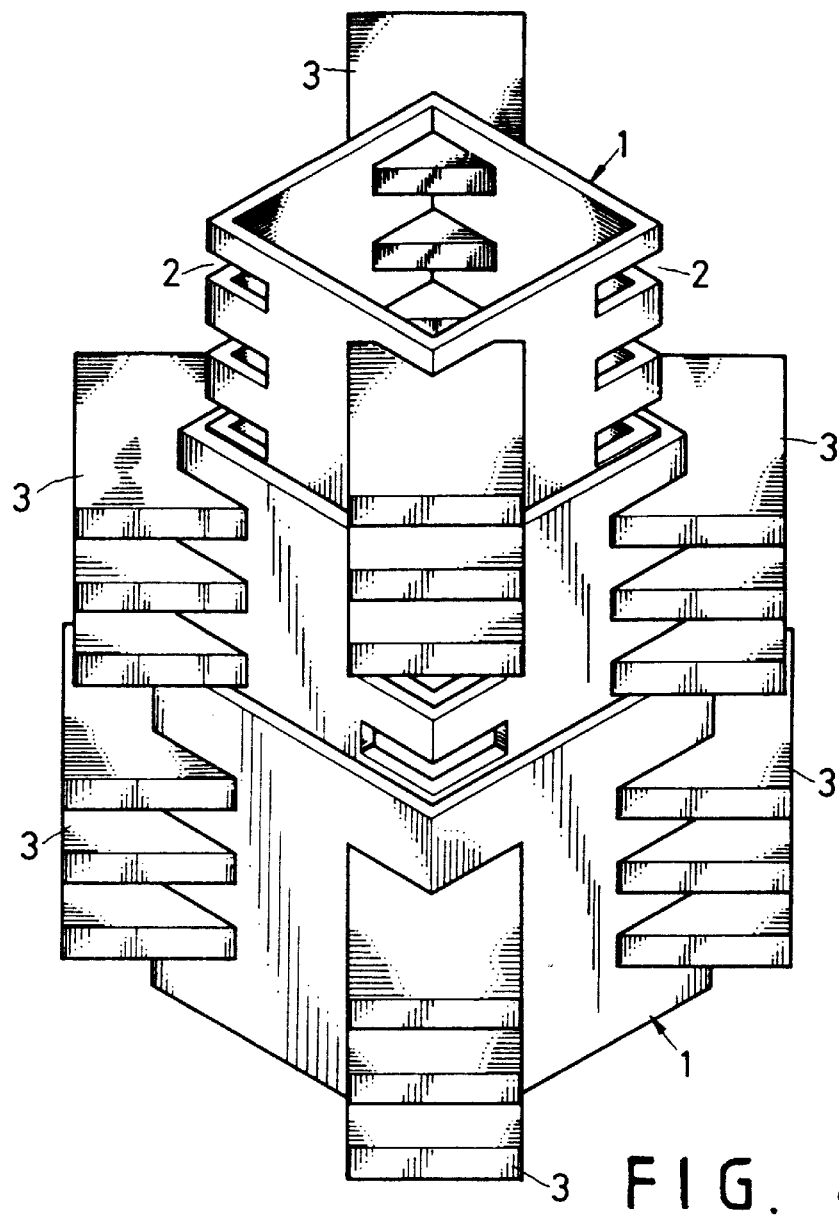
FIG. 4 is a preferable embodiment of the supporting shelf.

As shown in FIG. 4, a plurality of CD 3 has been inserted into the receiving slots 2 of the tubular housing 1.

Figure 5:
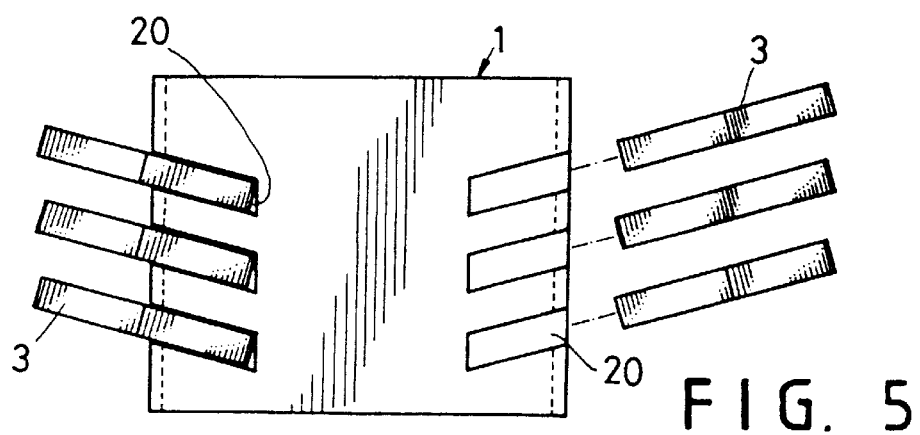
FIG. 5 is a side elevation view of the supporting shelf.
Figure 6:
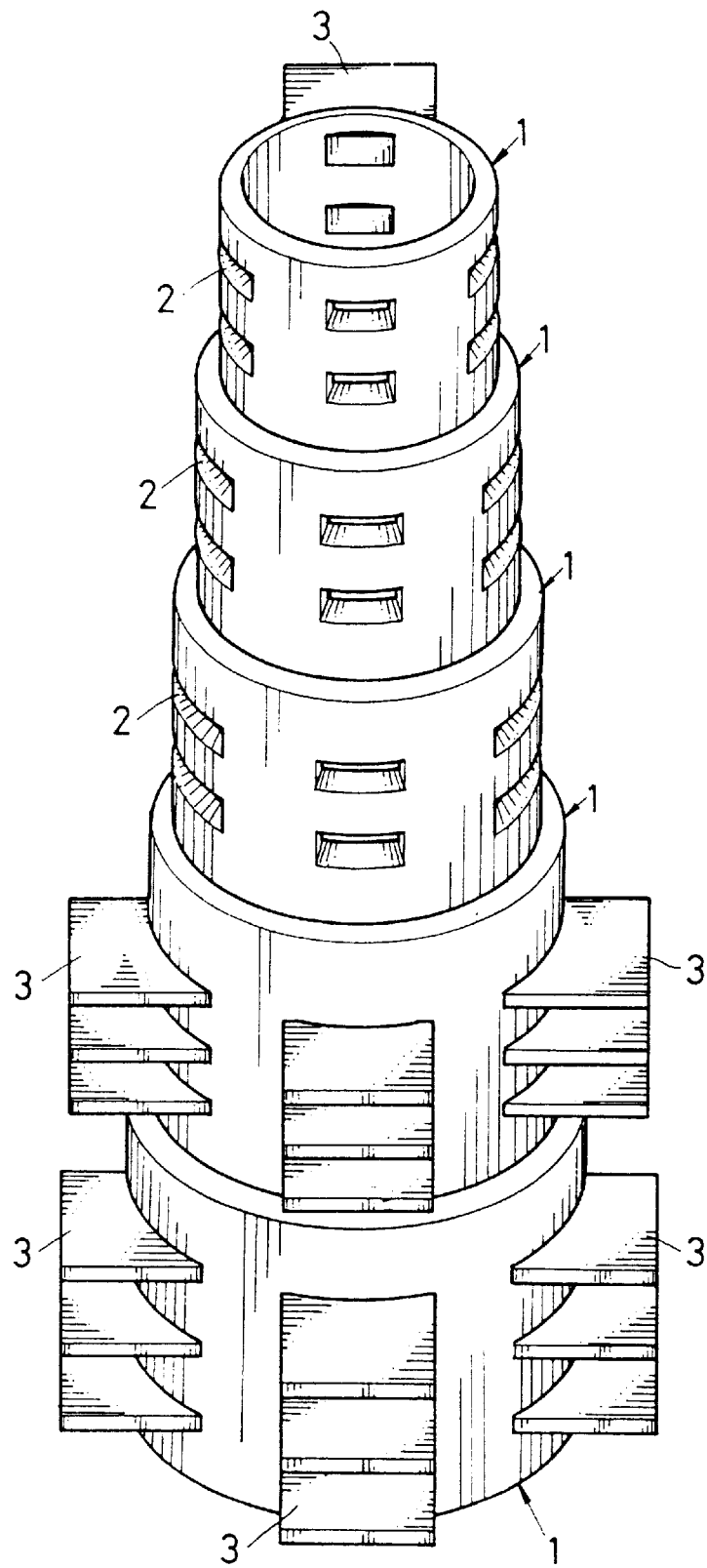
FIG. 6 is another embodiment of the supporting shelf.
Figure 7:
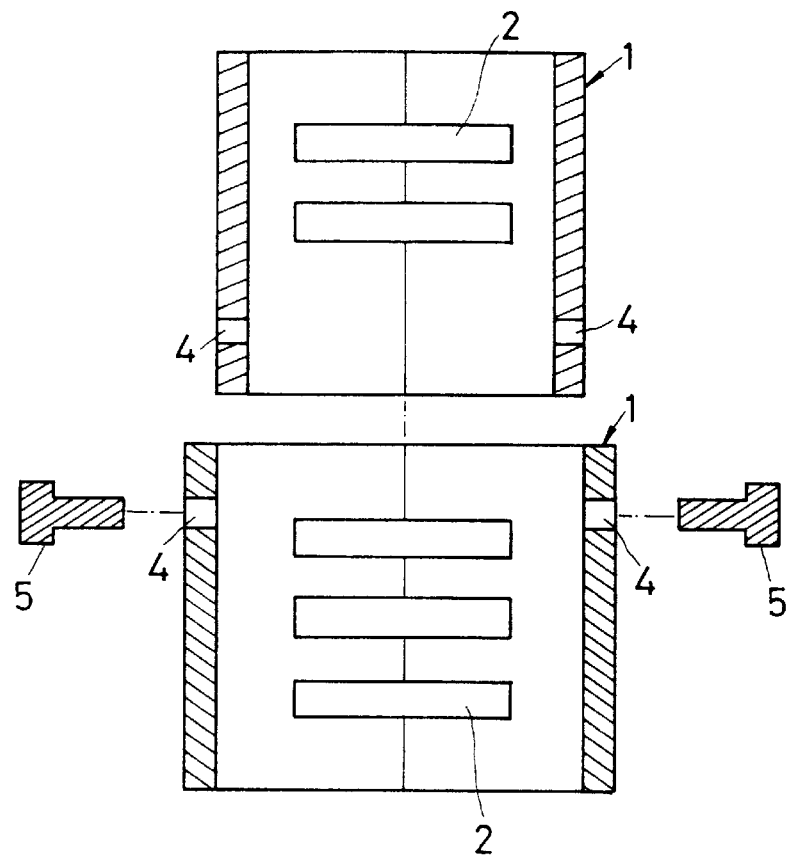
FIG. 7 is a cross sectional view of the fastening mechanism.

In the preferable embodiment of the tubular housing 1, the tubular housing 100 has a rectangular cross section. However, it may have another cross-section, such as a circular shape (see FIG. 6), an olive shape, and a polygonal shape. Besides, in order to provide a reliable engagement between the CD 3 and the receiving slot 2, the receiving slot 2 can be arranged angularly and upward, as shown in FIG. 5. Accordingly, the CD 3 that is inserted into the receiving slot 2 can be readily examined or checked by the customer. In an alternative, the bottom of the first tubular housing 1 can be mounted with a turntable (not shown), accordingly, even the tubular housing 1 is rotated, the CD 3 disposed therein will not escape from the receiving opening 20 of the receiving slot 2.

Figure 8:
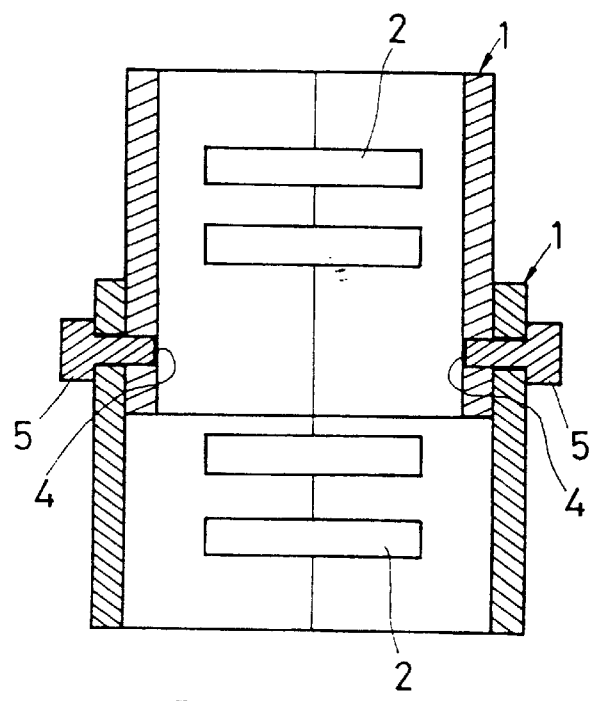
FIG. 8 is a schematic illustration showing the engagement of the fastening mechanism shown in FIG. 7.
Figure 9:
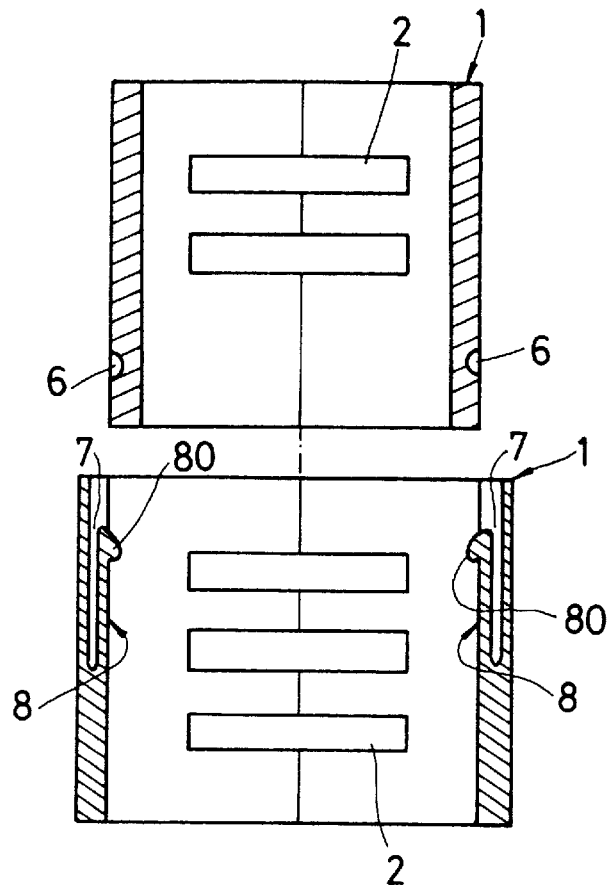
FIG. 9 is a cross sectional view of another fastening mechanism.

Except the interference engagement between the lower end of the second tubular housing 1' and the upper opening of the first tubular housing 1, each of the first and the second tubular housings 1, 1' can be provided with retaining holes 4 in which a retaining pin-shaft 5 can be passed and retained therebetween to position the second tubular housing 1' with respect to the first tubular housing 1, as shown in FIGS. 8 and 9. The retaining hole 4 can be located at any location, for example, between two adjacent receiving slots 2. However, other positions for the retaining hole 4 are also acceptable. When the number of the second tubular housing 1' is increased, the upper portion and the lower portion of the second tubular housing 1' can both be provided with retaining holes 4 for connecting with other tubular housing 1 or 1'.

Figure 10:
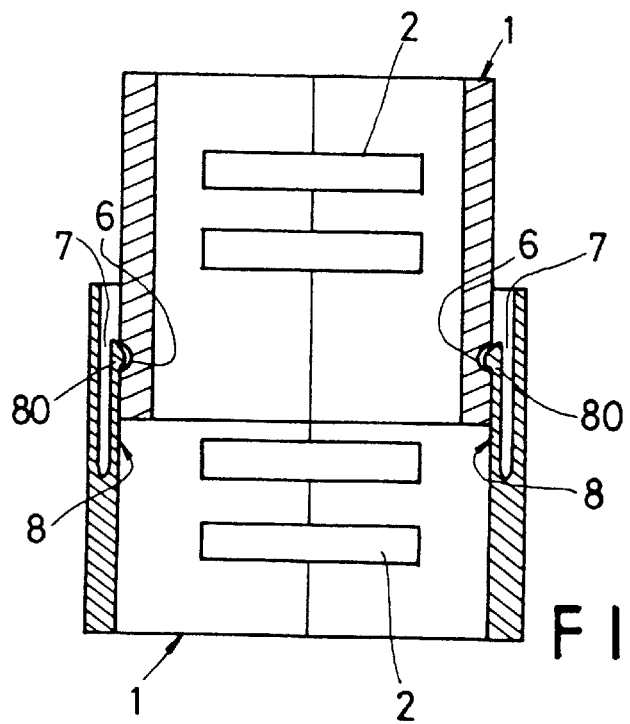
FIG. 10 is a schematic illustration showing the engagement of the fastening mechanism shown in FIG. 9.

On the other hand, the engagement between the first tubular housing 1 and the second tubular housing 1' can be facilitated by another arrangement. As shown in FIGS. 9 and 10, the outer wall of the second tubular housing 1' is provided with a recess 6, while the inner wall of the first tubular housing 1 is provided with a vertical groove 7 corresponding to that recess of the second tubular housing 1'. The lower portion of the vertical groove 7 is extended with a sliding rod 8 that is formed with a ball 80 having a smaller diameter than that of the recess 6. The diameter of the ball 80 equals to the depth of the vertical groove 7 plus the thickness of the sliding rod 8. By this arrangement, before the first tubular housing 1 and the second tubular housing 1' are engaged with each other, the ball 80 can be received within the vertical groove 7 until the ball 80 travels into the recess 6. In this case, the sliding rod 8 will move to let the ball 80 move into the recess 6. As a result, the first and second tubular housings 1, 1' are positioned with respect to each other.

When the number of the second tubular housing 1' increases, the outer wall of the second tubular housing 1' disposed in the middle layer, as shown in FIGS. 9 and 10, can be provided with a recess 6 and a vertical groove 7 that can be disposed in the inner wall of the second tubular housing 1'. Again, the lower portion of the vertical groove 7 can be provided with a sliding rod 8 that has a ball 80 at the free end.

It will be understood that each of the elements described above, or two or more together may also find a useful application in other types of methods differing from the type described above.

While certain novel features of this invention have been shown and described and are pointed out in the claims it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A supporting shelf for compact disks, comprising at least a first tubular housing (1) and a second tubular housing (1') and each having a different inner diameter but a similar cross section, said second tubular housing (1') being disposed within said first tubular housing (1), each of said first and second tubular housings (1, 1') having an opening directed upwards for ready engagement between said first and second tubular housings, each of said tubular housings (1, 1') being provided with a plurality of retaining slots (2) disposed in the outer wall and the retaining slots being parallel to each other, wherein a compact disk (3) can be readily inserted and retained by said retaining slots (2) of said first and second tubular housings (1, 1'), said first and second tubular housings being trapezoidal in shape, whereby each contains retaining slots on the outer wall and said second tubular housing having a lower portion that is slightly larger than an upper opening of said first tubular housing so that an interference engagement occurs between the lower portion and the upper opening when the second tubular housing is pulled upwardly with respect to the first tubular housing.

* * * * *